UNITED STATES PATENT OFFICE.

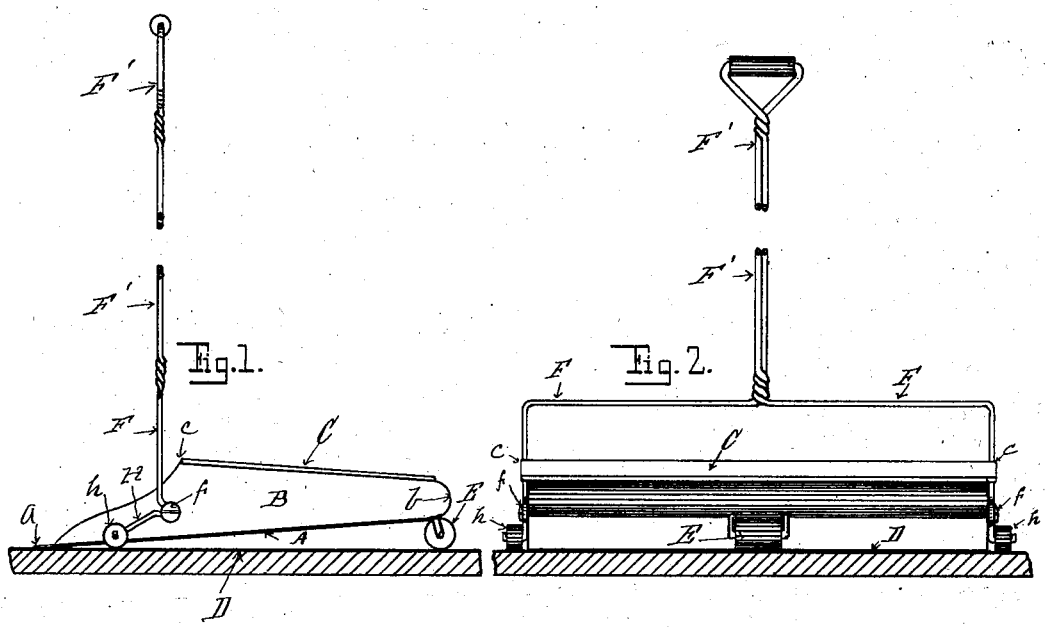

ELMER GREEN, OF NORTHEAST, PENNSYLVANIA.

DUST-PAN.

SPECIFICATION forming part of Letters Patent No. 721,365, dated February 24, 1903.

Application filed April 16, 1902. Serial No. 103,148. (No model.)

*To all whom it may concern:*

Be it known that I, ELMER GREEN, a citizen of the United States, residing at Northeast, in the county of Erie and State of Pennsylvania, have invented certain new and useful Improvements in Dust-Pans; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in dust-pans; and it consists substantially in the features hereinafter set forth and described, and has for its object the production of a dust-pan with a hinged handle provided with means for retaining it in an upright position when the pan is upon the floor and also provided with a central support under the rear end of the pan, whereby the edge of the pan will at all times contact with the floor. These and other features of this invention are hereinafter fully set forth, described, and illustrated in the accompanying drawings, in which—

Figure 1 is a side view in elevation of my improved dust-pan. Fig. 2 is a rear end view of the same. Fig. 3 is a side view of the same when suspended by the handle.

In the drawings illustrating my invention, A is the bottom, B B the sides, and C the top, of the pan, which top C extends approximately two-thirds of the distance from the rear end $b$ of the pan to the front edge $a$ of the bottom A of the pan, so that the space between the bottom A and the top C forms a receptacle for dust swept into the pan and retains it therein when the pan is suspended in the position shown in Fig. 3. To insure the front edge $a$ of the bottom contacting at all times with the floor D, I secure under the rear end $b$ of the pan a central support, which I preferably make in the form of a roller E, which operates to support the rear end $b$ of the pan a short distance above the floor D and operates to prevent inequalities in the floor D from preventing the front edge $a$ of the bottom from contacting at all points therewith. The handle I preferably make in the form of a bale F, terminating in a handle F', of such length that the operator can use the dust-pan without materially stooping from an upright position. This bale I preferably pivot to the sides B B by means of pivots $f f$, and on the bale portion F there is a handle F'. I make forwardly-extending arms H H on the bale, preferably provided with rollers $h\ h$, adapted to contact with the floor D and prevent the handle F' from falling forward when the pan is on the floor. To prevent the handle F' from falling backward, the front ends $c\ c$ of the cover C extend slightly beyond the ends B B of the pan, so that the bale F will contact therewith, thus always retaining the handle F' in an upright position when the pan is upon the floor ready for use.

The operation of my device is so obvious from the foregoing description that further description thereof is deemed unnecessary.

Having thus described my invention so as to enable others to construct and use the same, what I claim as new, and desire to secure by Letters Patent of the United States, is—

1. The combination in a dust-pan, of a cover over the rear portion thereof projecting over the sides of the pan, a handle bifurcated at its lower end and pivoted to the sides of the dust-pan and adapted to contact when raised with the projecting portions of the cover, and arms on said handle projecting forwardly from the pivoted points thereof and contacting with the floor, substantially as and for the purpose set forth.

2. The combination in a dust-pan, of a cover over the rear portion thereof, a central roller-support pivoted under the rear end of the bottom thereof, a handle bifurcated at its lower end and pivoted to the sides of the dust-pan, forwardly-projecting arms on the handle, and rollers pivoted in the ends of said arms, substantially as and for the purpose set forth.

In testimony whereof I affix my signature in presence of two witnesses.

ELMER GREEN.

Witnesses:
 E. MONETHROPE,
 FRANK H. HILLS.